Figures 1, 2, 3:
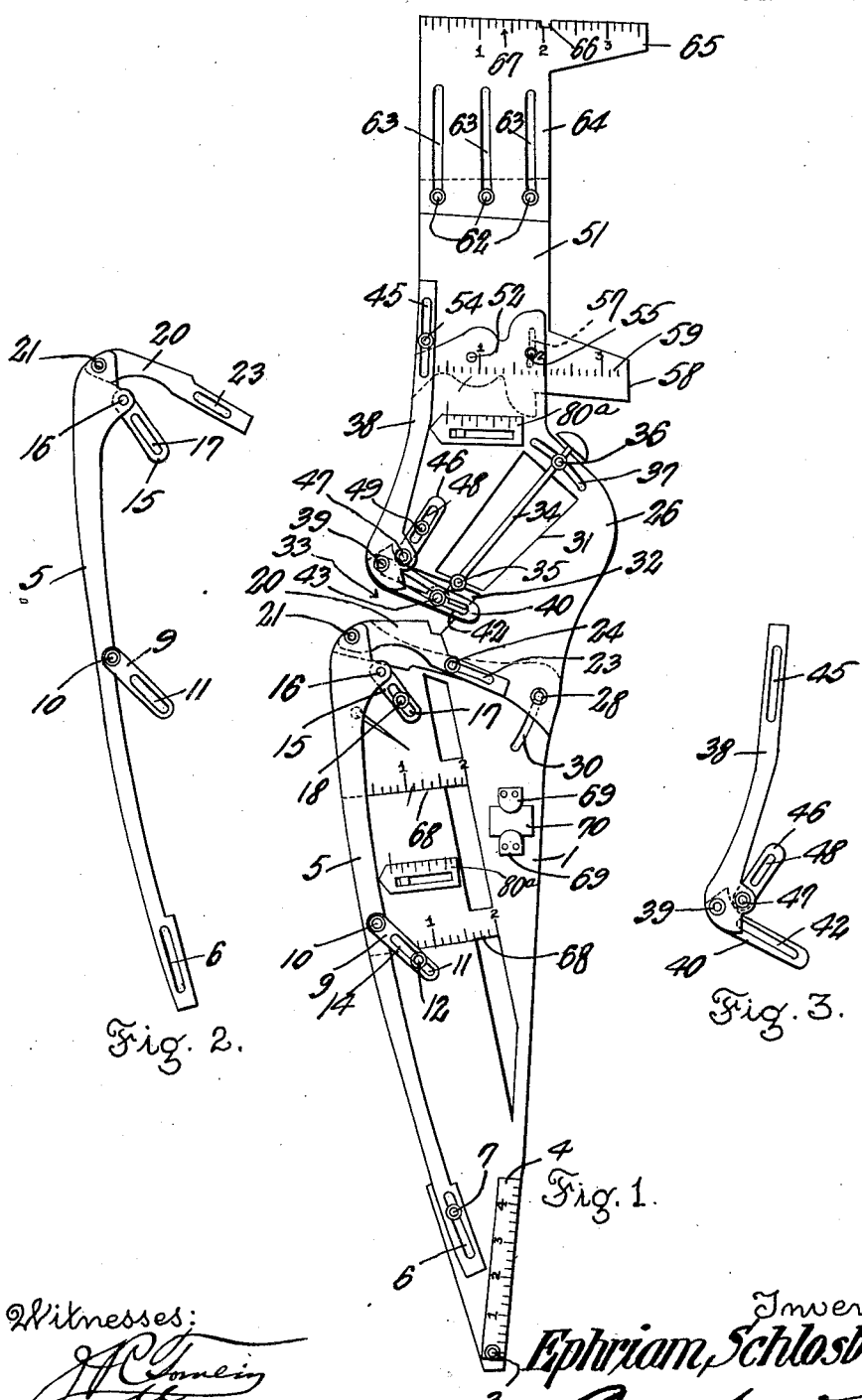

E. SCHLOSBERG.
PATTERN FOR ADJUSTING COAT SHAPES.
APPLICATION FILED DEC. 31, 1912.

1,097,822.

Patented May 26, 1914.
5 SHEETS—SHEET 1.

Witnesses:

Inventor:
Ephriam Schlosberg
C. A. Snow & Co.
Attorneys.

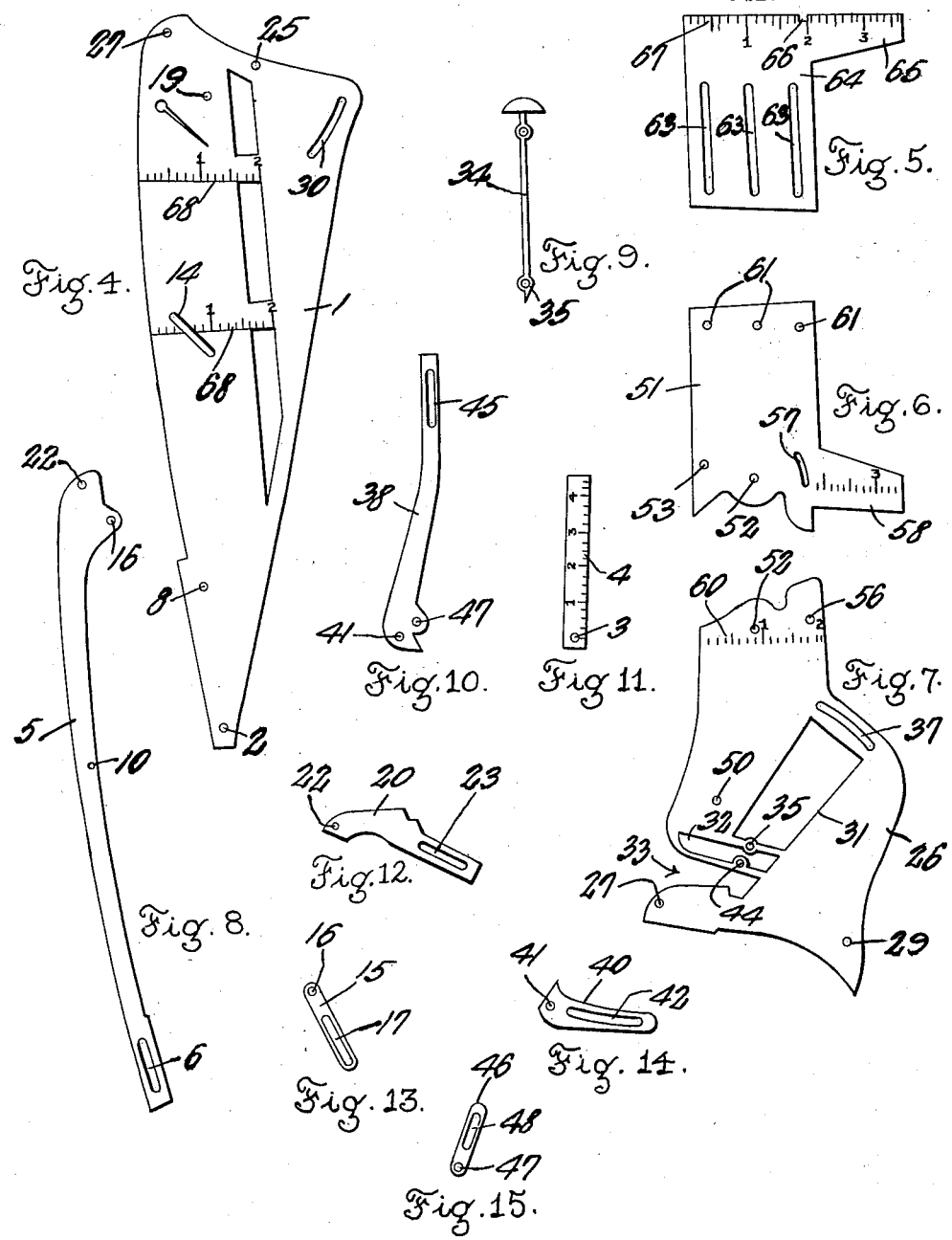

E. SCHLOSBERG.
PATTERN FOR ADJUSTING COAT SHAPES.
APPLICATION FILED DEC. 31, 1912.
1,097,822.
Patented May 26, 1914.
5 SHEETS—SHEET 3.
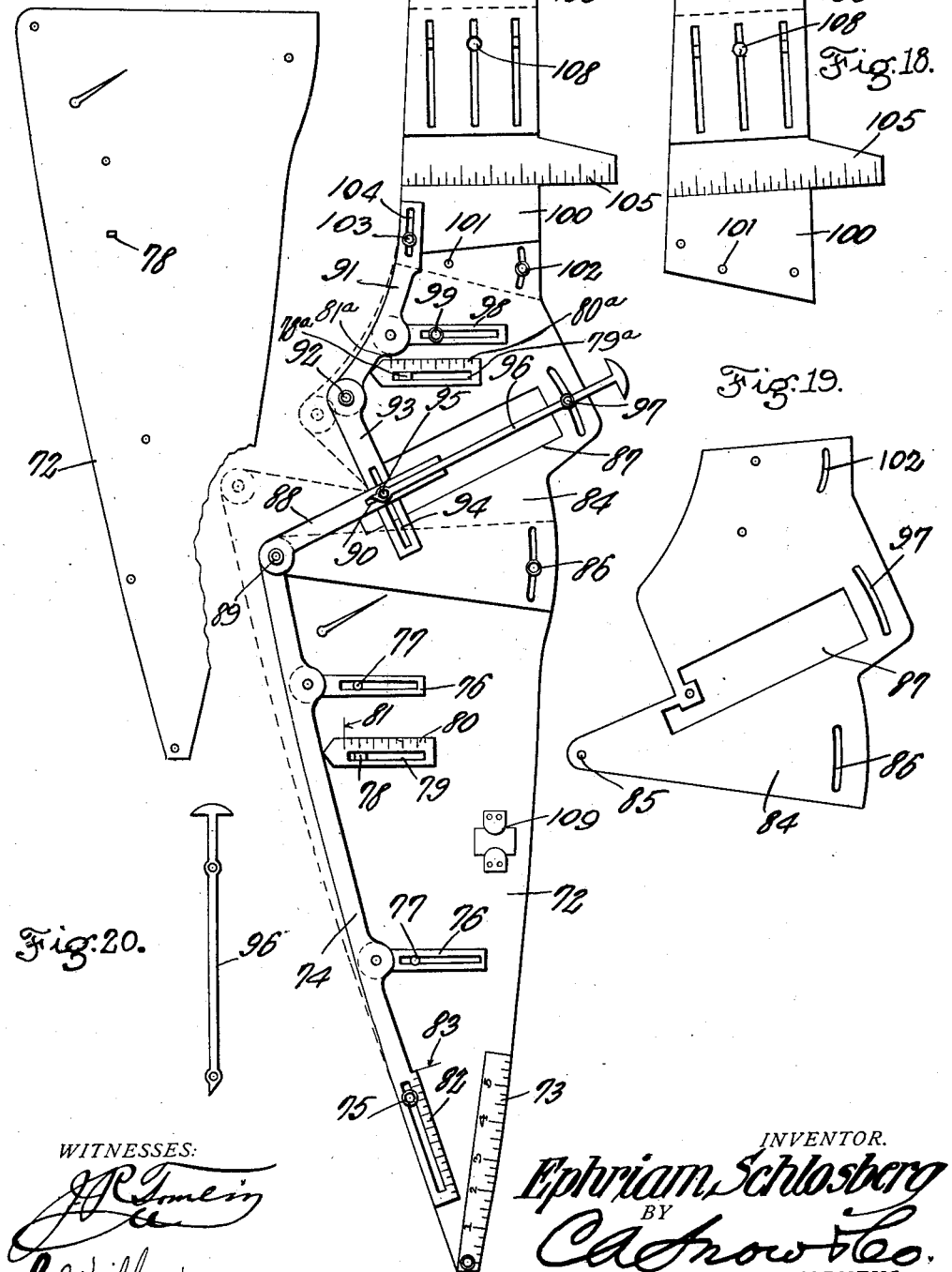

E. SCHLOSBERG.
PATTERN FOR ADJUSTING COAT SHAPES.
APPLICATION FILED DEC. 31, 1912.
1,097,822.
Patented May 26, 1914.
5 SHEETS—SHEET 4.
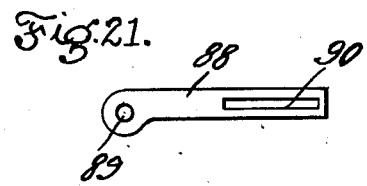
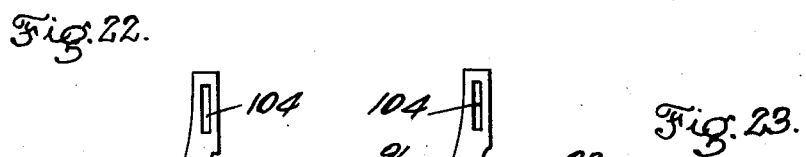
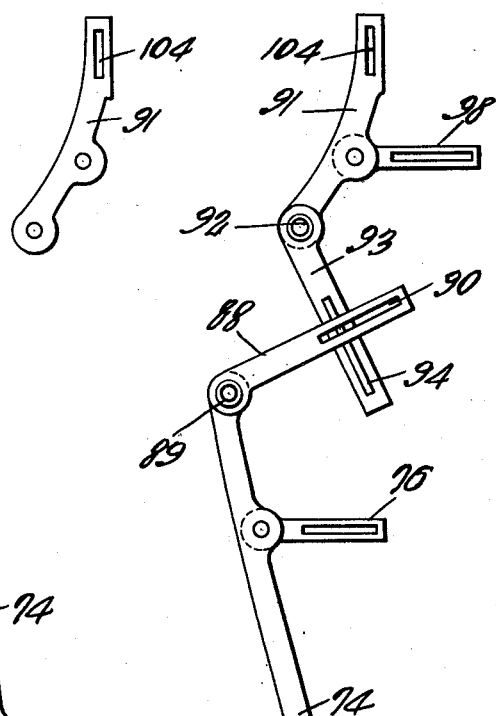
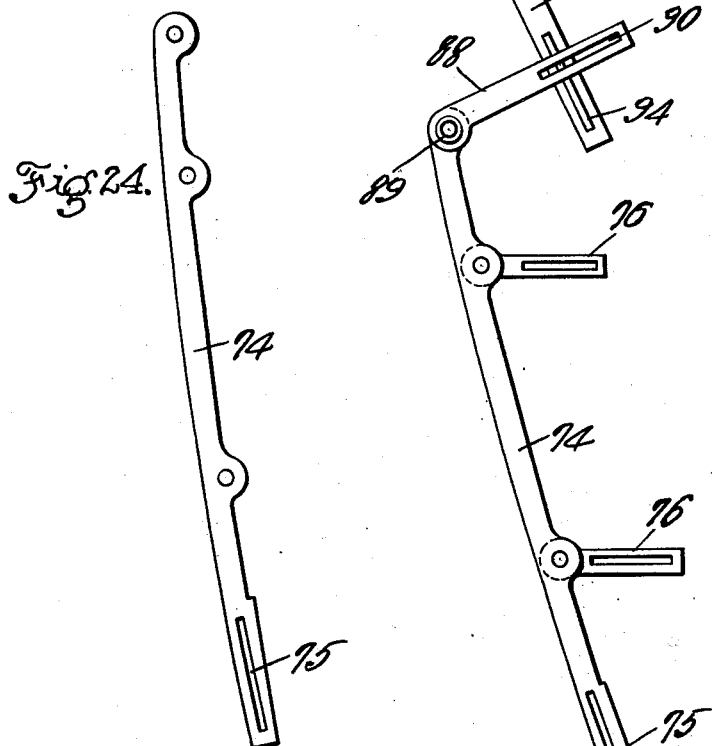
WITNESSES:
INVENTOR.
Ephriam Schlosberg
BY
ATTORNEYS

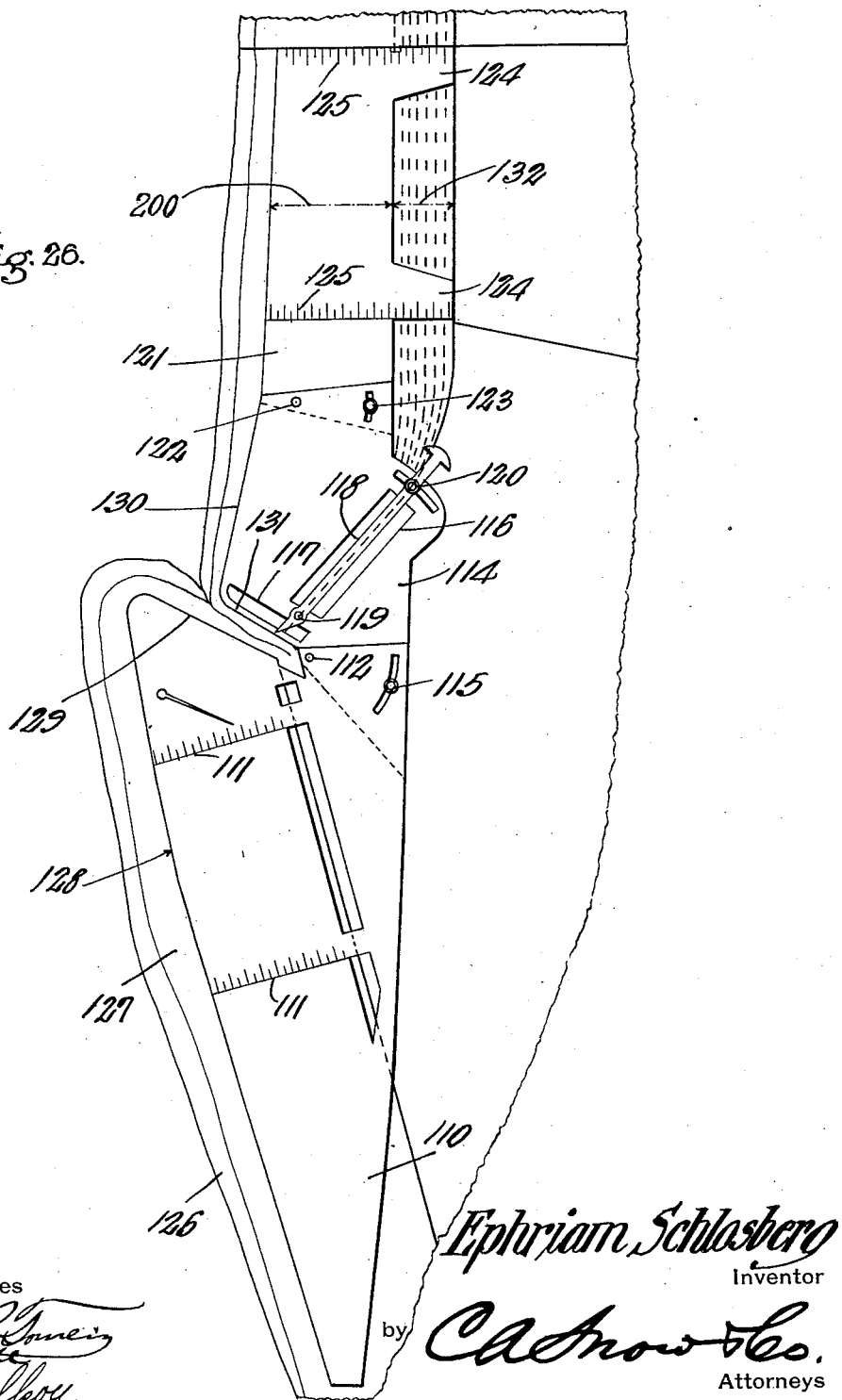

UNITED STATES PATENT OFFICE.

EPHRIAM SCHLOSBERG, OF BALTIMORE, MARYLAND.

PATTERN FOR ADJUSTING COAT SHAPES.

1,097,822.  Specification of Letters Patent.  Patented May 26, 1914.

Application filed December 31, 1912. Serial No. 739,533.

*To all whom it may concern:*

Be it known that I, EPHRIAM SCHLOSBERG, a citizen of the United States, residing at Baltimore, State of Maryland, have invented a new and useful Pattern for Adjusting Coat Shapes, of which the following is a specification.

The device constituting the subject matter of this application is a pattern adapted to be employed for laying out coat shapes, the term "shape" being employed in the tailors' art to designate the collar and the lapel.

In practical operation, the shape is first trimmed roughly and approximately to the desired size, and subsequently, the shape is trimmed down to the exact contour desired. This trimming operation, at present, is intrusted to a skilled mechanic, who by eye and by judgment, trims the shape to the style desired. As a consequence, no matter how closely it may be attempted to follow the fashion plate, no two shapes come from the hand of the operator exactly alike. The desired style and cut, is therefore, approximated only.

The present invention aims to provide novel means whereby the outline of the shape comprising the collar and the lapel, may be determined accurately.

Another object of the invention is to provide a device of this type having adjustable means for determining and fixing the contour of the lapel and of the collar.

Another object of the invention is to provide novel means whereby the seam between the collar and the lapel, together with the notch in the lapel, may be determined accurately.

It is within the scope of the invention to improve generally and to increase the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 shows the pattern assembled; Fig. 2 is a plan of the arm and auxiliary parts, whereby the outer edge of the lapel and the upper edge thereof, at the notch, is determined; Fig. 3 is a plan of the arm which is adjustable to define one edge of the collar; Fig. 4 is a plan of the main plate; Fig. 5 is a plan of the secondary plate; Fig. 6 is a plan of the supplemental plate; Fig. 7 is a plan of the auxiliary plate; Fig. 8 is a plan of the arm which, in Fig. 2, is shown assembled with the parts which are connected with the arm; Fig. 9 is a plan of the gage; Fig. 10 is a plan of one element shown in Fig. 3; Fig. 11 is a plan of the scale which is pivotally assembled with one end of the main plate; Fig. 12 is a plan of the extension which is pivotally connected with the arm shown in Fig. 8; Fig. 13 is a plan of one of the links which is assembled with the arm shown in Fig. 8; Fig. 14 is a plan of the link employed in the structure shown in Fig. 3; Fig. 15 is a plan of another link entering into the construction shown in Fig. 3; Fig. 16 is a plan showing a modified form of the invention; Fig. 17 is a plan of the main plate employed in that form of the invention which is shown in Fig. 16; Fig. 18 is a plan showing the supplemental and secondary plates assembled; Fig. 19 is a plan of the auxiliary plate; Fig. 20 is a plan of the gage; Fig. 21 is a plan of one of the connecting links; Fig. 22 is a plan of one arm; Fig. 23 is a plan showing the adjustable arms and links in coöperative relation; Fig. 24 is a perspective of the arm which coöperates with the link or extension shown in Fig. 21; Fig. 25 is a plan of the link which is pivotally assembled with the arm shown in Fig. 22; and Fig. 26 shows in plan, a modified form of the invention applied to the work.

Referring to that form of the invention which is shown in Figs. 1 to 15 inclusive of the drawings, there is shown a main plate 1, provided adjacent one end with an opening 2 adapted to receive a clamp screw 3 constituting a pivotal mounting for a scale 4, shown in detail in Fig. 11. Overlying one edge of the main plate 1 and supported thereby is an arm 5, supplied at one end with a slot 6 receiving a clamp screw 7 mounted in an opening 8 in the plate 1. A link 9 is pivoted at 10 to the arm 5, adjacent the middle portion of the arm, the link 9 having a slot 11 receiving a clamp screw 12 adapted to move in a slot 14 formed diagonally in the main plate 1. A link 15 is pivoted as indicated at 16 to the arm 5 adjacent one end of the arm, the link 15 having a slot 17 receiving a clamp screw 18 mounted in an opening 19 in the plate 1. One end of an extension 20, shown in Fig. 12 is held by a clamp screw 21 to one end of the arm 5, there being openings 22 in the extension 20 and in the arm 5 adapted to receive the clamp screw. In the extension 20 there is a slot 23 adapted to receive a clamp screw 24 mounted in an opening 25 formed in the plate 1 adjacent one end of the plate. Inscribed transversely upon the plate 1 are scales 68. At any point upon the plate 1 may be mounted spring fingers 69, or any other suitable holding device, adapted to retain a card 70.

The invention further includes an auxiliary plate 26 which is shown in detail in Fig. 7. The auxiliary plate 26 and the main plate 1 are pivotally connected, openings 27 being provided in the plates for this purpose. A clamp screw 28 is engaged in an opening 29 in the auxiliary plate 26 and is adapted to move in a slot 30 in the main plate 1. In the auxiliary plate 26 there is a diagonally extended opening 31, below which is located a transverse opening 32, there being a notch 33 in one edge of the plate 26, beyond the opening 32. A gage 34 is provided, the same being shown in detail in Fig. 9. The gage 34 is pivoted as indicated at 35 to the auxiliary plate 26. The gage 34 carries a clamp screw 36 adapted to move in a slot 37 in the auxiliary plate 26. An arm 38 lies along one edge of the auxiliary plate 26, the arm being shown in detail in Fig. 10. By means of a clamp screw 39, the arm 38 is connected with a transversely extended link 40, there being openings 41 in the link and in the arm, adapted to receive the clamp screw. The link 40 is shown in detail in Fig. 14, and is equipped with a slot 42 receiving a clamp screw 43 held in an opening 44 in the auxiliary plate 26. In the other end of the arm 38 there is a slot 45. A link 46 is pivoted at 47 to the arm 38 through the medium of a clamp screw or otherwise, the link having a slot 48 receiving a clamp screw 49 engaged in an opening 50 in the plate 26.

The invention further includes a supplemental plate 51 shown in Fig. 6. The plates 26 and 51 are pivotally connected as shown at 52 and in the plate 51 there is an opening 53 receiving a clamp screw 54 which is engaged in the slot 45 of the arm 38. A clamp screw 55 is provided, the same being engaged in an opening 56 in the auxiliary plate 26 and in a slot 57 in the supplemental plate 51. The supplemental plate 51 is equipped with an outstanding arm 58 upon which is inscribed a scale 59, the scale 59 being continued as indicated at 60 upon the auxiliary plate 26. Adjacent one end, the supplemental plate 51 is equipped with openings 61 adapted to receive clamp screws 62.

A secondary plate 64 is provided, the same having slots 63 in which the clamp screws 62 are received, the secondary plate being provided with a laterally extended arm 65 provided with a notch 66 and inscribed along its upper edge with a scale 67.

The plates 1, 26, 51 and 64 constitute a support upon which the fiducial structures comprising the parts 5, 20, 38 and 40 are mounted.

The pattern hereinbefore described is adapted to be employed upon double breasted coats of any description, and may be used for stock or measured work.

The operation of the structure above described is as follows:—By loosening the clamp screw 3, the scale 4 may be swung outwardly, and be held in an adjusted position, the scale 4 being employed when it is desired to lay off the lapel on a coat of unusual size. Owing to the fact that the arm 5 is longitudinally slotted at one end as indicated at 6, the arm may be adjusted longitudinally. A transverse adjustment of the arm 5 is effected through the medium of the links 9 and 15. The extension 20 may be moved in the direction of its length owing to the presence of the slot 23, and a transverse movement of the extension is possible owing to the fact that the extension and the arm 5 are pivotally connected as indicated at 21. The arm 38 may be moved longitudinally, owing to the presence of the slot 45 and the arm may be swung outwardly at its lower end with the clamp screw 54 as a pivot. The arm 38 may be held in any adjusted position through the medium of the link 46. A longitudinal movement of the link 40 is possible because the link is slotted as shown at 42. The link 40 may be moved transversely owing to the pivotal connection afforded at 39 between the link and the arm 38. It is obvious that the movable parts of the structure may be held in adjusted position by manipulating the clamp screws hereinbefore described specifically.

In operation, the shape, roughly outlined and cut as hereinbefore described is placed beneath the pattern. The outer edge of the lapel is marked along the outer edge of the arm 5, the mark being continued along the upper edge of the extension 20 to define the lower edge of the notch in the lapel. The pattern is then moved until the line which has been traced along the upper edge of the extension 20 appears through the opening 32 in the auxiliary plate 26, this operation allowing for the seams. The edge of the collar is then traced along the outer edge of the arm 38 and along the lower edge of the link 40, the mark along the lower edge of the link 40 defining the upper edge of the notch in the lapel. The collar mark may be continued along the outer edges of the plates 51 and 64. The height of the collar is determined by the scales 67 and 59, the space existing between the notch 66 and the free end of the arm 65 serving to define the stand of the collar and the space between the notch 66 and the forward edge of the plate 64 serving to define the drop or overlap of the collar.

From what has been stated hereinbefore, it will be obvious that the notch 66 serves to determine the roll or point of bending at the top of the collar.

The gage 34 may be swung upon its pivotal mounting 35 by loosening the clamp screw 36. The gage 34 serves to define the seam between the lapel and the collar. The scales 68 are employed to determine the reveer on Prince Albert coats. By loosening the clamp screw 28, the plate 26 may be swung upon its pivotal connection with the main plate 1 so as to shift the upper portion of the pattern laterally. The pattern may be elongated or shortened by moving the secondary plate 64 upon the supplemental plate 51, the slots 63 permitting this adjustment.

In practical operation, the pattern is set to conform to the style shown in the pattern book, and to avoid confusion the card 70 which is held by the spring fingers 69 may bear a number corresponding to the style number.

It will be understood that the shapes of the adjustable parts of the structure may be altered at will, depending upon the cut which is to be given to the garment. Thus, the arm 5, the extension 20, the arm 38 and the link 40 will be curved as may be deemed expedient.

In Figs. 17 to 25, there is shown a modified form of the invention adapted to be employed for laying off shapes upon single breasted coats.

The form of the invention under discussion differs but little from the form hereinbefore described, and the description may be abbreviated accordingly.

The main plate is indicated by the reference character 72 and carries the scale 73 which is pivotally mounted as before. The arm which is supported by the main plate 72 is indicated by the reference characters 74 and is connected with the main plate for longitudinal movement through the medium of the clamp and slot union 75. Slotted links 76 are pivoted to the arm 74 and are engaged by clamp screws 77 which engage the main plate 72. Outstanding from the main plate 71 is a squared stud 78 received in a slot 79 formed in a scale 80. The construction is such that the scale 80 is held for right line sliding movement. The scale 80 coöperates with a mark 81 on the plate 72 and is adapted to bear against the inner edge of the arm 74 to indicate the extent of outward movement of the arm. Longitudinal movement of the arm is determined by a scale 82 inscribed upon the arm and adapted to coöperate with a mark 83 on the plate.

The auxiliary plate is denoted by the numeral 84 and is pivoted to the main plate 72 at 85. Relative movement between the plates 84 and 72 is limited by a slot and clamp 86.

In the auxiliary plate 84 there is a transverse opening 87. An extension 88 is prolonged within the contour of the opening 87, the extension 88 being pivotally connected, through the medium of a clamp screw or otherwise, indicated at 89, to one end of the arm 74. The extension 88 is provided with a longitudinal slot 90. An arm 91 is supported by the plate 84 and is pivoted as indicated at 92, by a set screw or otherwise, to a link 93, intersecting the extension 88 and provided with a longitudinal slot 94. In the intersecting slots 90 and 94 is mounted a clamp screw 95 constituting a pivotal mounting for the gage 96, the same being adjustably connected for swinging movement to the plate 84 by means of a clamp and slot union 97. A link 98 is pivoted to the arm 91, the link being held upon the plate 84 adjustably by means of a clamp screw 99.

The supplemental plate, indicated at 100, is pivoted as shown at 101 to the auxiliary plate 84, an adjustment between the plates 100 and 84 being effected through the medium of a clamp and slot union 102. The plate 100 carries a clamp screw 103 engaged in a slot 104 in the arm 91. The plate 100 is equipped with an outstanding, graduated arm 105.

The secondary plate is shown at 106 and is provided with an outstanding, graduated arm 107 coöperating with the arm 105 to determine the width of the collar and the stand thereof. The secondary plate 106 is connected with the supplemental plate 100, for sliding movement, through the medium of the clamp and slot union 108.

The main plate 72 is provided with a card holder 109. The plates 72, 84, 100 and 106 constitute a support upon which the fiducial structures comprising the parts 74, 88, 91 and 93 are mounted.

The operation of the structure last above described will be understood readily from what has been said hereinbefore in connection with that form of the invention shown in Figs. 1 to 15.

Referring to that form of the invention which is disclosed in Fig. 26, the main plate is shown at 110, the same having transverse scales 111. The main plate 110 is pivoted at 112 to the auxiliary plate 114, relative movement between the plates being prevented by a clamp and slot connection 115. The auxiliary plate 114 is provided with an opening 116 and with another, transverse opening 117. The gage 118 extends across the opening 117 and is pivoted at 119 to the plate 114, movement of the gage being prevented by means of a clamp and slot connection 120. The supplemental plate 121 is pivoted at 122 to the auxiliary plate 114, relative movement between the plates being prevented by a clamp and slot connection 123. The supplemental plate 121 is provided with outstanding arms 124 carrying scales 125.

In operation, the pattern above described is placed upon the work, the numeral 126 indicating the canvas and the numeral 127 indicating the goods.

The marking edges of the plate 110 are indicated at 128 and 129, the marking edges of the plate 114 being indicated at 130 and 131. The distance indicated at 132 upon the goods indicates the stand of the collar and the distance indicated at 200 indicates the drop of the collar.

In all forms of the invention, a pair of pivotally connected members are provided having edges extending longitudinally of the pattern and angularly disposed edges extended transversely of the pattern, these edges, in some instances, constituting parts of elements movable upon the plates, and, as shown in Fig. 26, constituting the edges of the plates themselves. In all forms of the invention, one of the pivotally connected members is provided with an opening across which the movable gage extends, and in all forms of the invention, an opening is provided through which to disclose the marks made along one of the fiducial edges, when the pattern is slid.

It is to be understood, that all of the patterns hereinbefore shown and described, are so constructed that either side thereof may be placed uppermost, permitting a reversal of the pattern, scales being inscribed upon both sides of the pattern to effect the desired end.

The scale hereinbefore described specifically and indicated by the reference character 80, may be used wherever desirable, as indicated in other locations upon the drawings by the reference character 80ª.

It will be obvious that any and all of the patterns shown in this application may be used in connection with women's coats, body coats and similar garments of every description, and of any and all sizes.

Having thus described the invention, what is claimed is:—

1. In a lapel and collar pattern, pivotally connected main and auxiliary plates extended in opposite directions from their point of pivotal connection and in approximate longitudinal alinement and fiducial structures adjustably held upon the plates, each fiducial structure comprising pivotally connected parts, one of which parts extends longitudinally of the pattern, the other of which parts extends transversely of the pattern, the last specified parts being located adjacent each other and near to the inner ends of the first specified parts.

2. In a lapel and collar pattern, a main plate; an auxiliary plate pivoted to the main plate and in approximate longitudinal alinement therewith; a supplemental plate pivoted to the auxiliary plate; a secondary plate connected with the supplemental plate for movement longitudinally of the pattern; and fiducial structures adjustably mounted upon the main and auxiliary plates, each fiducial structure comprising a part extended longitudinally of the pattern and a part extended transversely of the pattern, the last specified parts being located adjacent each other and near to the inner ends of the first specified parts.

3. In a lapel and collar pattern, a support having a notch in one edge; and fiducial structures adjustable upon the support, the fiducial structures including arms lying adjacent the longitudinal edges of the support and angularly disposed extensions lying adjacent the edges of the notch.

4. In a lapel and collar pattern, a support having an opening and provided with a notch in one edge; fiducial structures adjustable upon the support and including oppositely extended arms lying along the longitudinal edge of the plates and angularly disposed extensions lying adjacent the edges of the notch; and a gage movably held upon the support, the gage extending across the opening.

5. In a lapel and collar pattern, a support; fiducial structures held upon the support for universal movement in a single plane, the fiducial structures including oppositely extended arms and extensions pivoted to the adjacent ends of the arms and disposed at an angle to the arms, the extensions being prolonged in the same general direction and being spaced adjacent their pivotal connections with the arms to constitute notch-defining elements.

6. In a lapel and collar pattern, a support; an arm mounted pivotally upon the support along one edge of the support; and an extension connected to one end of the arm and extended transversely of the support; there being an opening in the support adapted, when the pattern is slid on the work, to disclose a mark made along the extension, thereby to allow for the collar seam.

7. In a lapel and collar pattern, a support provided along one end with a scale and having upon one edge an outstanding arm having a scale, the scales being adapted to indicate the height and the stand of the collar; and fiducial members adjustable upon the support adjacent the other edge of the support, the fiducial members constituting means for outlining the lapel and the collar.

8. In a lapel and collar pattern, pivotally connected plates; arms located adjacent the edges of the plates; means for mounting the arms for longitudinal movement and for transverse movement; extensions disposed at an angle to the arms and pivoted to the arms; means for holding the extensions fixed; and means for holding the plates against pivotal movement.

9. In a lapel and collar pattern, pivotally connected members having edges extended longitudinally of the pattern and angularly disposed edges extended transversely of the pattern, one member being provided with two openings, a movable gage on said member and extended across one opening, the other opening being adapted to disclose a mark made along the transverse edge of the other member, when the pattern is slid on the work.

In testimony that I claim the foregoing as my own, I have hereto affixed my signature in the presence of two witnesses.

EPHRIAM $\overset{\text{his}}{\times}$ SCHLOSBERG.
mark.

Witnesses:
 SELINA WILLSON,
 M. B. LAWTON.

Copies of this patent may be obtained for five cents each, by addressing the "Commissioner of Patents, Washington, D. C."